(12) United States Patent
Zhou

(10) Patent No.: US 9,986,221 B2
(45) Date of Patent: May 29, 2018

(54) VIEW-AWARE 360 DEGREE VIDEO STREAMING

(71) Applicant: Visbit Inc., Sunnyvale, CA (US)

(72) Inventor: Changyin Zhou, San Jose, CA (US)

(73) Assignee: VISBIT INC., Sunnyvale, CA (US)

( * ) Notice: Subject to any disclaimer, the term of this patent is extended or adjusted under 35 U.S.C. 154(b) by 0 days. days.

(21) Appl. No.: 15/481,752

(22) Filed: Apr. 7, 2017

(65) Prior Publication Data

US 2017/0294049 A1  Oct. 12, 2017

Related U.S. Application Data

(60) Provisional application No. 62/320,451, filed on Apr. 8, 2016.

(51) Int. Cl.

| G09G 5/00 | (2006.01) |
|---|---|
| H04N 13/00 | (2018.01) |
| H04N 21/81 | (2011.01) |
| H04N 21/2662 | (2011.01) |
| H04N 21/218 | (2011.01) |
| H04N 13/02 | (2006.01) |
| G06F 3/01 | (2006.01) |

(52) U.S. Cl.
CPC ......... *H04N 13/0018* (2013.01); *G06F 3/011* (2013.01); *H04N 13/0029* (2013.01); *H04N 13/0278* (2013.01); *H04N 21/21805* (2013.01); *H04N 21/2662* (2013.01); *H04N 21/816* (2013.01)

(58) Field of Classification Search
None
See application file for complete search history.

(56) References Cited

U.S. PATENT DOCUMENTS

| 2015/0249813 A1 | 9/2015 | Cole et al. |
| 2015/0286719 A1* | 10/2015 | Sampathkumaran |
| | | ......................... G06F 17/30831 |
| | | 707/772 |
| 2016/0150212 A1 | 5/2016 | Moura et al. |
| 2016/0260196 A1* | 9/2016 | Roimela ................. G06F 3/013 |
| 2016/0277772 A1 | 9/2016 | Campbell et al. |
| 2016/0352791 A1 | 12/2016 | Adams et al. |
| 2016/0353146 A1 | 12/2016 | Weaver et al. |
| 2017/0075416 A1 | 3/2017 | Armstrong |
| 2017/0085620 A1* | 3/2017 | Swaminathan ........... G06F 1/00 |
| 2017/0230576 A1* | 8/2017 | Sparks ............... H04N 5/23238 |

FOREIGN PATENT DOCUMENTS

WO    WO2017/053370    3/2017

* cited by examiner

*Primary Examiner* — Frank Chen
(74) *Attorney, Agent, or Firm* — McDonnell Boehnen Hulbert & Berghoff LLP

(57) ABSTRACT

The present disclosure relates to systems and methods that deliver 360° video streams, which may be used in virtual reality and augmented reality content. Namely, a 360° video stream may be divided into a plurality of video streams, each stream of which corresponds to a portion of a viewing volume or viewing sphere. Additionally, the original 360° video stream may be downsampled to a lower resolution 360° video stream. For a given user view angle, one or more of the plurality of video streams may be considered active streams and connected to a user interface or display for data download. In such a scenario, a user interface may be connected to at least one high resolution video stream that corresponds to the user view angle as well as a low resolution 360° video stream.

19 Claims, 9 Drawing Sheets

VIEW-AWARE 360 DEGREE VIDEO STREAMING

CROSS-REFERENCE TO RELATED APPLICATIONS

This application is a non-provisional of U.S. Provisional Patent Application Ser. No. 62/320,451 filed Apr. 8, 2016, the contents of which are hereby incorporated by reference.

BACKGROUND

360° video (or spherical video) is an important media format for many applications, including those providing immersive environments for virtual reality (VR) and augmented reality (AR). A viewer of a 360° video may view the video at arbitrary angles and possibly within a small field of view (FOV). Accordingly, to appear sharp, a 360° video may need a much higher resolution than a regular video. In such scenarios, a 360° video stream may require much higher bitrates than a conventional video stream. For example, while a typical 1080p video may have a bitrate of about 1 MBps (or 60 MB file size for 1 minute video), a 360° video of the same view resolution may include a bitrate of about 10 MBps or more (or 600 MB file size for 1 minute video). The view resolution may include the resolution of a video frame that a viewer may observe at a given point in time.

The bitrate of a 360° video may be higher than data transfer rates in existing consumer level wireless networks. As a result, 360° videos may be pre-downloaded and/or aggressively down-sampled for streaming, which may be undesirable, if not unacceptable, for some applications.

View-aware streaming methods, which stream portions of the 360° video based on a user's view, have been used for video telepresence applications, but only with significant computational cost in streaming server. View-aware streaming has also been applied to 360° video streaming, but with significant extra storage cost at the server.

SUMMARY

In an aspect, a system is provided. The system includes a display, a sensor, a communication interface, and a controller. The controller includes a memory and at least one processor. The at least one processor is configured to execute instructions stored in the memory so as to carry operations. The operations include receiving, from the sensor, information indicative of a viewing orientation within a viewing volume. The viewing orientation corresponds to a field of view. The operations also include determining, based on the viewing orientation, a plurality of active regions from a plurality of viewable regions in the viewing volume. The operations yet further include connecting, via the communication interface, to a plurality of video streams that correspond to the plurality of active regions. The operations additionally include receiving, via the plurality of video streams, first video information corresponding to the plurality of active regions. The operations include receiving second video information corresponding to a 360° field of view. The first video information has a higher resolution than the second video information. The operations also include rendering a 360° video based on the first video information in the plurality of active regions and the second video information in regions of the viewing volume outside the plurality of active regions. Yet further, the operations include displaying, via the display, at least a portion of the 360° video corresponding to the field of view.

In an aspect, a system is provided. The system includes a communication interface and a controller. The controller includes a memory and at least one processor. The at least one processor is configured to execute instructions stored in the memory so as to carry operations. The operations include dividing a 360° video stream into a plurality of regional streams. The operations also include downsampling the 360° video stream to provide a lower resolution 360° video stream and receiving, via the communication interface, a request. The request includes at least one active region. The operations yet further include providing, via the communication interface, at least one regional stream corresponding to the at least one active region. The operations also include providing, via the communication interface, the lower resolution 360° video stream.

In an aspect, a method is provided. The method includes receiving, from a sensor, information indicative of a viewing orientation within a viewing volume. The viewing orientation corresponds to a field of view. The method also includes determining, based on the viewing orientation, a plurality of active regions from a plurality of viewable regions in the viewing volume. The method additionally includes connecting, via a communication interface, to a plurality of video streams that correspond to the plurality of active regions. The method yet further includes receiving, via the plurality of video streams, first video information corresponding to the plurality of active regions. The method includes receiving second video information corresponding to a 360° field of view. The first video information has a higher resolution than the second video information. The method further includes rendering a 360° video based on the first video information in the plurality of active regions and the second video information in regions of the viewing volume outside the plurality of active regions. The method additionally includes displaying, via a display, at least a portion of the 360° video corresponding to the field of view.

In an aspect, a system is provided. The system includes various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure relates to a system and method to stream a portion of a viewing volume or viewing sphere that a user may be viewing. In an example embodiment, a view-aware streaming system and method may reduce the bandwidth requirement for streaming 360° videos, without significant extra storage or computation cost in the streaming server.

II. Example Embodiments

A. Operation of a Streaming Client Device

Figure 1A:
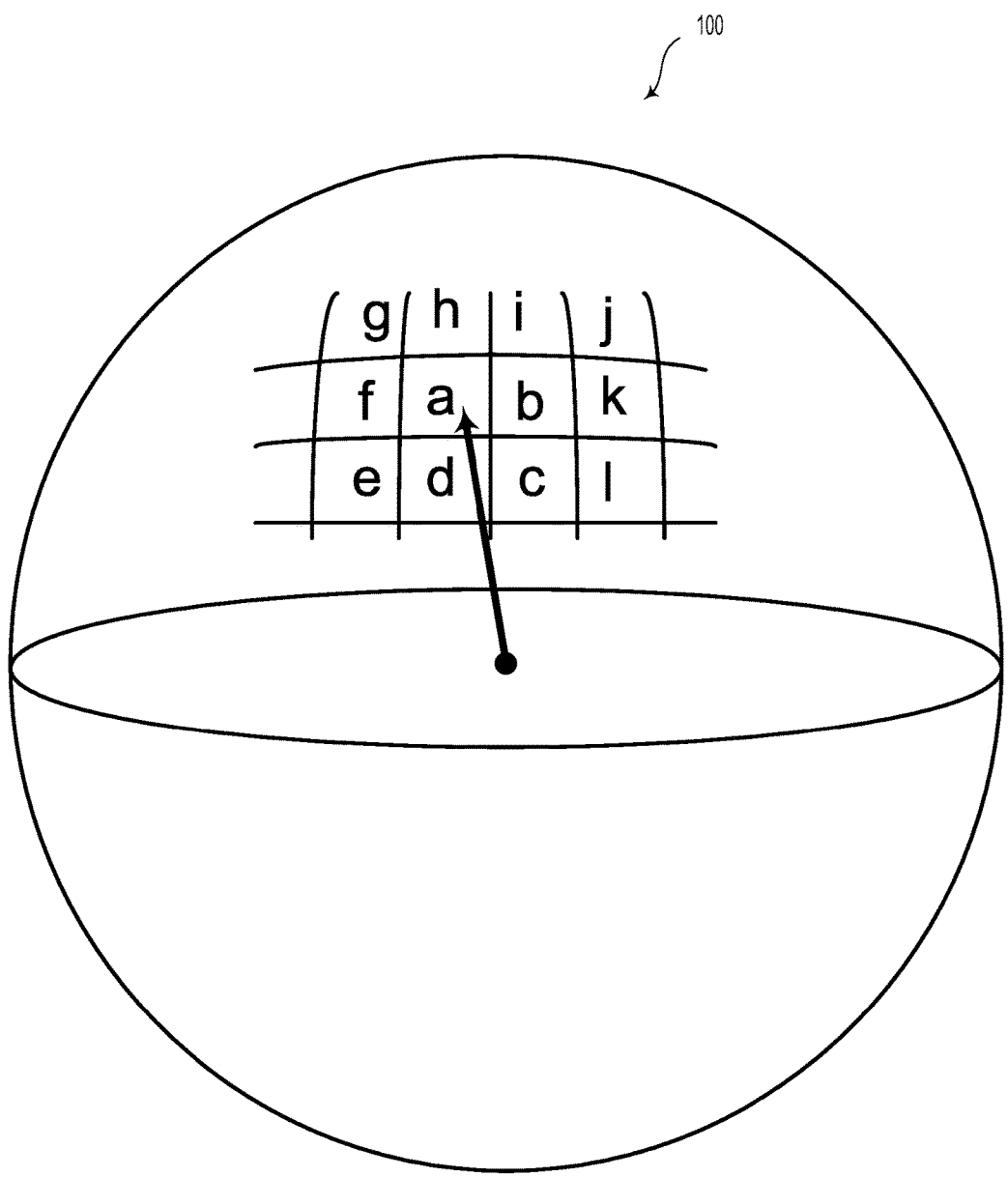
FIG. 1A illustrates a view sphere, according to an example embodiment.

FIG. 1A illustrates a view sphere 100, according to an example embodiment. In such a scenario, the view sphere 100 is divided into n regions as shown in FIG. 1A. In an example embodiment, there may be little or no overlap between adjacent regions. Regions may be rectangular, however other shapes, or combinations of various shapes are possible. In alternative embodiments, the viewing volume may include shapes other than a sphere. For example, the viewing volume may include a cylinder, square, pyramid, or another type of viewing volume.

Figure 1B:
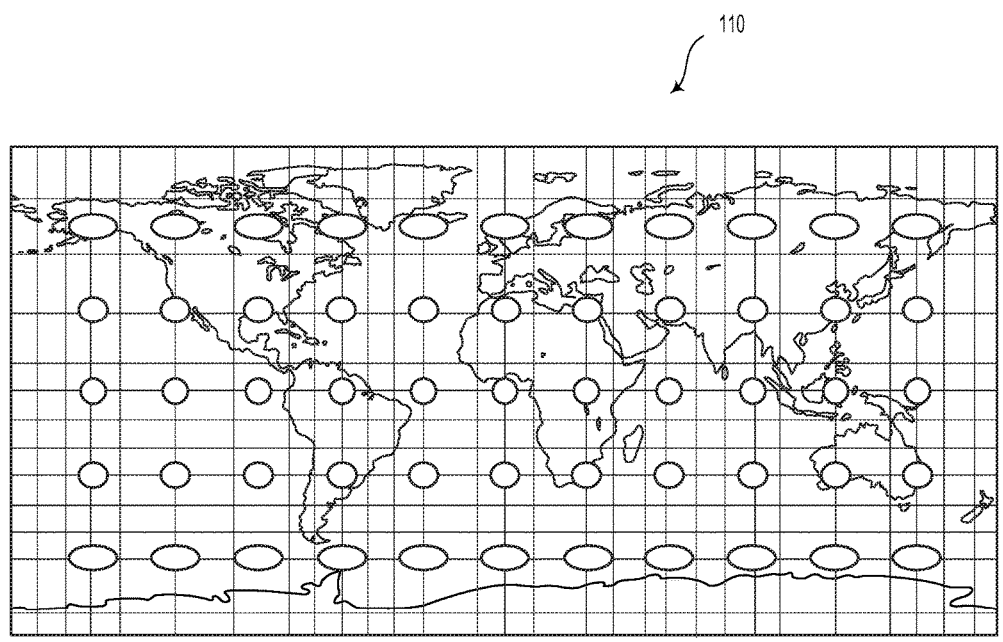
FIG. 1B illustrates an equirectangular projection of the world, according to an example embodiment.

In an example embodiment, a view sphere (e.g., with respect to a 360 degree camera or a viewer of 360 degree content) may be projected in two-dimensions based on a variety of different projection types. For example, an equirectangular projection is a popular way to warp a spherical view into a rectangle image. FIG. 1B illustrates an equirectangular projection of the world 110, according to an example embodiment.

In a similar fashion, each frame in a 360 degree video can be represented as a 2D image using an equirectangular projection. In one embodiment, we can divide this equirectangular presentation into multiple regions. The division can be done in various ways. For example, one can divide the map uniformly into identical rectangles. That is, an equirectangular presentation of a 360 degree video frame may be divided up into rectangular regions with substantially identical areas. While FIG. 1B illustrates an equirectangular projection, other types of projections are contemplated. For example, projections such as transverse Mercator, Mercator, Lambert, etc., are possible and contemplated herein. Alternatively, pseudocylindrical, azimuthal, or conic projections are also considered possibilities.

Additionally or alternatively, the 360 degree view sphere (regardless of projection type) may be divided into regions so that each region includes an identical or similar amount of video information. Furthermore, the regions may be divided to reduce or minimize correlation between regions.

For example, in many 360 degree videos, the top field of view includes large area of blue sky, which may include a relatively low information density. In such a scenario, a horizontal field of view may include many details. As such, if the view sphere is divided to include a similar amount of video information, fewer regions (e.g., having larger areas) may be located in the top field of view (or other areas of low information density). In comparison, fields of view along the horizon may be divided into smaller area regions (based on their higher information density).

Figure 1C:
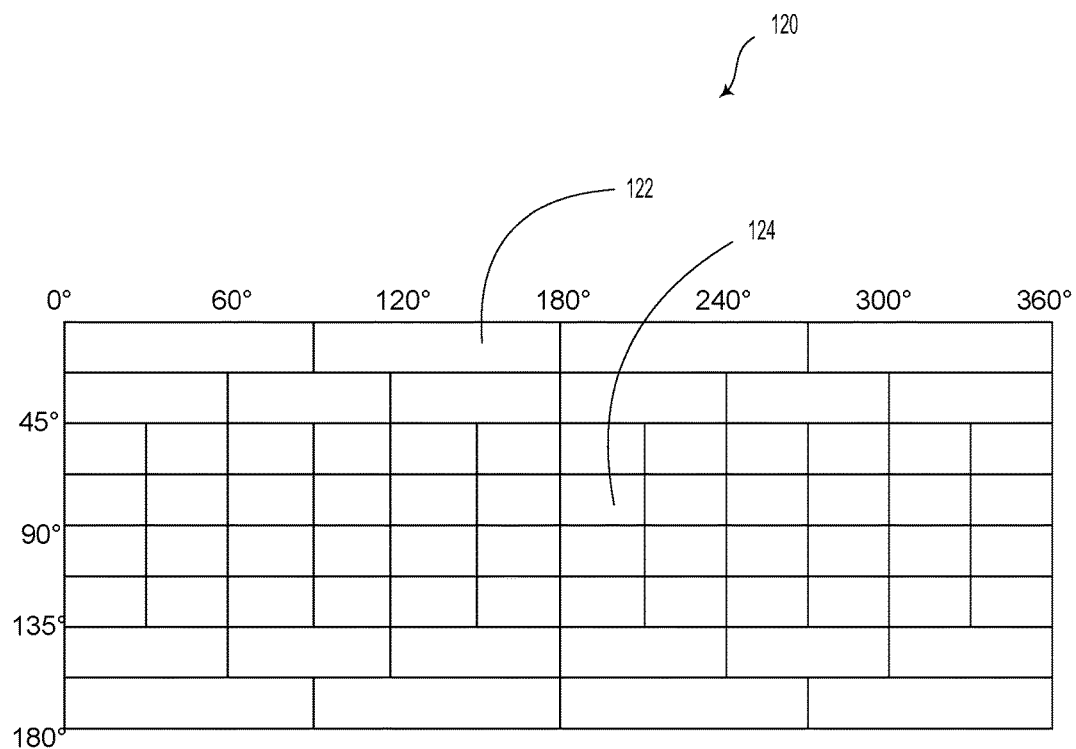
FIG. 1C illustrates a plurality of regions of an equirectangular projection, according to an example embodiment.

FIG. 1C illustrates a plurality of regions 120 of an equirectangular projection of a 360-degree video frame, according to an example embodiment. As illustrated in FIG. 1C, a top field of view may be divided into relatively large area regions (e.g., region 122). Furthermore, fields of view near the horizon may be divided into relatively small area regions (e.g., region 124).

While FIG. 1C illustrates a particular plurality of regions 120, it is understood that a variety of other ways to divide the 360-degree video frame are possible and contemplated. In an example embodiment, a projected 360-degree video frame may undergo a region division process to achieve substantially "equi-information" in each region. For example, an entropy map (or another type of map based on per-pixel or pixel region information) may be calculated for each frame of the video. Entropy maps of a given video segment or clip may be averaged on a per-pixel basis. Such an averaging process may provide a two-dimensional map of average entropy over the given video segment or clip: $E(x,y)$. Various algorithms may be used (linear programing, dynamic programing, or other numerical optimization algorithms) to divide $E(x,y)$ into multiple regions having as-equal-as-possible pixel information sums. That is, based on the entropy map for a given video segment or clip, regional division may be performed so as to create regions with similar amounts of pixel information. As used herein in this context, "similar amounts of pixel information" may include each regional stream having nearly the same bandwidth requirements (e.g., within 1% or 5%). Additionally or alternatively, "similar amounts of pixel information" may include a regional stream with nearly the same memory size (e.g., again within 1% or 5%). As such, regional 360 degree video streams may be more efficiently handled.

In one embodiment, we propose to divide rectangular map into regions, which may occupy about the same region in the original sphere. With that, each region is likely to carry similar amount data during streaming, and hence improve stream quality. An example of this division is shown below; however, embodiments involving other region sizes and/or map division processes are contemplated as well.

Figure 2:
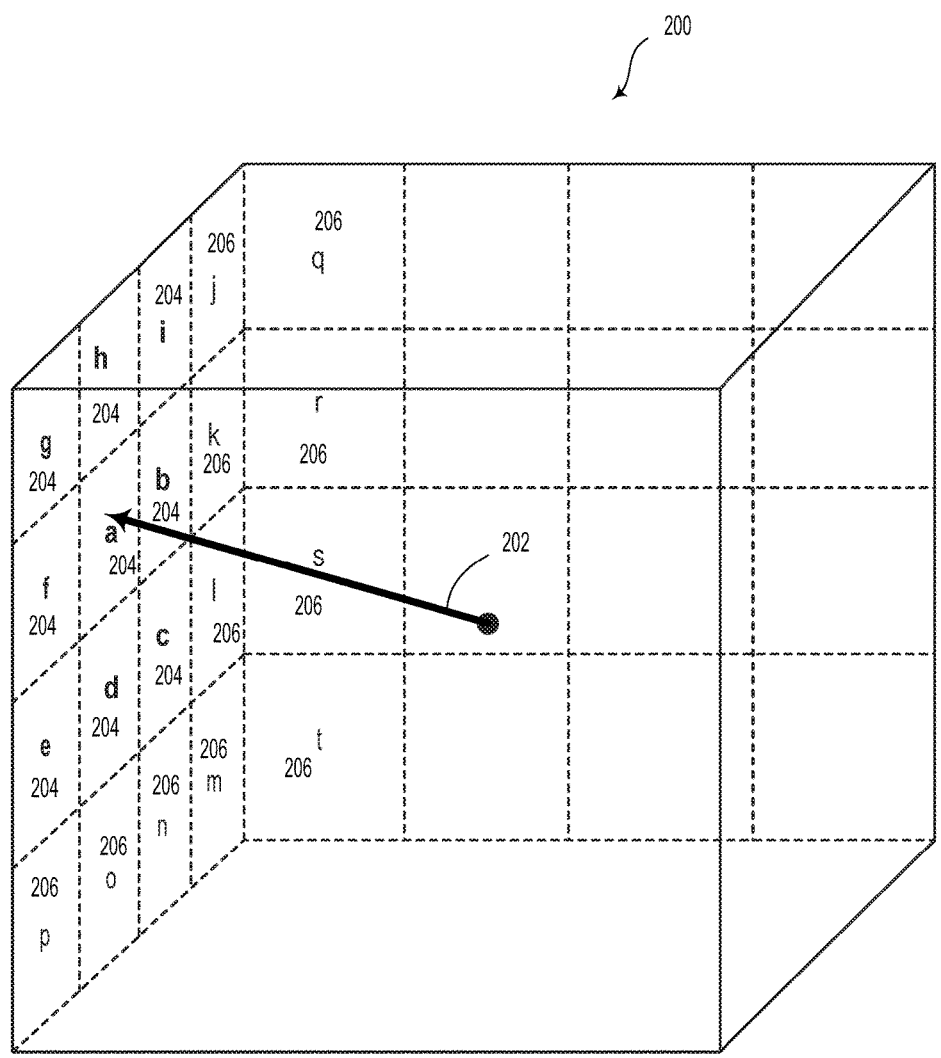
FIG. 2 illustrates a cube map, according to an example embodiment.

FIG. 2 illustrates a cube map 200, according to an example embodiment. A 360° view may also be represented as cube map 200, as shown in FIG. 2. That is, the 360° view may be divided into six views, one view for each side of the cube map 200. Further, as an example, each cube surface may be further subdivided into multiple tiles. In an example embodiment, the original 360° video stream may be divided into n regional streams, which may be named $H_a$, $H_b$, $H_c$, ... $H_n$. In addition, systems and methods may include downsampling the original 360° video stream to a low resolution 360° stream, L.

In such a scenario, a plurality of video and audio streams may be provided to a streaming client. The streaming client may include an application on a smartphone, a mobile VR headset (e.g., Samsung Gear VR), a tethered VR headset (e.g., Oculus Rift), or another type of computing or display device.

In an example embodiment, a system or method may include receiving information about a viewing orientation. For instance, the viewing orientation may be provided by a sensor on a VR headset. For a given user view angle, a controller may determine the m regions, where m<n, that cover at least the field of view corresponding to the viewing orientation. For example in FIG. 2, the arrow 202 shows the current view angle. In an example embodiment, the active regions proximate to the current view angle (e.g., regions a, b, c, d, e, f, g, h, and i) may be identified as being regions that correspond to a user's view angle. The streams for these active regions 204 may be termed "active streams." In contrast, the areas located away from the user's view angle may include "inactive regions" 206.

As an example, a client device (e.g., a VR headset) may request the active streams from one or more servers. In such a scenario, the client device may request and connect to high resolution active streams $H_a$, $H_b$, $H_c$, $H_d$, $H_e$, $H_f$, $H_g$, $H_h$, and $H_i$, as well as lower-resolution stream L. The server(s) may responsively provide data associated with the active streams (e.g., video streams corresponding to the active regions 204) and the low resolution stream, L. Accordingly, the client device may download both high resolution video data relating to active regions corresponding to the viewing orientation as well as lower-resolution video data corresponding to the entire viewing sphere. In an example embodiment, it is noted that stream L (e.g., the lower-resolution video stream) may be always connected to provide at least display of low-resolution video of the entire viewing sphere regardless of viewing orientation.

Systems and methods described herein may include rendering a viewable 360° video using the data of stream L. Furthermore, rendering may include a "mosaic" of high resolution pixels, which may be formed by stitching adjacent active streams oriented according to their corresponding regions along the viewing sphere. In an example embodiment, all rendering is synchronized in time. Synchronization may be accomplished based on one or more timestamps or another type of frame synchronization.

In an example embodiment, a change in the viewing orientation may be detected. That is, an angle of the client device (e.g., the VR headset) may change due to, for example, a viewer rotating or otherwise moving their head. When such a change in viewing orientation is detected, an updated set of active regions may be determined based on the updated viewing orientation. For example, as illustrated in FIG. 2, if the view angle shifts to be centered on tile 'b', the active regions will become b, k, l, c, d, a, h, i, and j. Other types of changes in viewing orientation are possible and contemplated herein.

In an embodiment, a sound track (e.g., an audio stream) may be combined with the low resolution video stream, L, which is always connected, to make sure a low-resolution 360° video and corresponding sound track may be available at all times.

In another embodiment, the sound track may be delivered via a separate stream. This stream may always be connected and such sound data will be synchronized with video data and rendered (played back) in sync with the video images.

B. Network Latency and Motion Prediction

In some scenarios, a viewing orientation may change to a new viewing region without high resolution video being available yet. That is, the headset may move to a new viewing orientation before high resolution video is downloaded via a video stream. In such a scenario, a display of the headset may temporarily display low resolution video from persistent stream L, data of may be prebuffered. Stream L may be preferentially connected to the client at all times. Latency may be considered as a time period between when a user moves away from an initial view angle and when the proper high resolution video stream has been displayed at the headset. In the case where latency becomes greater than a threshold value, the lower-resolution video stream may be presented to a viewer while waiting for high resolution video streams to sync. During this latency period, a viewer may only see low resolution frames from stream L.

In some embodiments, one or more high resolution video streams may become disrupted, laggy, or corrupted. In such scenarios, the client device may provide low resolution video from stream L until the one or more high resolution video streams are restored.

Additionally or alternatively, motion prediction may be used to reduce the latency. For example, a sensor may be configured to provide velocity V and/or acceleration A of the client device. From V and A, a change of angle may be predicted within a time t to be $V*t+0.5*A*t*t$. As such, the client device may request, and connect to, the corresponding video streams in advance. More complicated motion prediction may be used to predict complicated viewing orientation trajectories (e.g., movement based on vibration or other types of periodic or cyclic motion). In other embodiments, the motion prediction may be performed based on the video content itself. For example, if the video content includes a tennis match, a motion prediction algorithm may provide video streams based on a location of the tennis ball within the video content with the assumption that a viewer may want to track the flight of the tennis ball.

In an example embodiment, active streams may cover a wider region than the field of view. In such a scenario, users may see high resolution content while adjacent new active regions are loading as long as the field of view is still within a prior active region. However, users may be provided with low-resolution video content (from stream L) if the viewing orientation changes by a large amount within a short period of time. In other words, by making the active region larger than the field of view, download latency may be reduced.

In some embodiments, the overall size of the active region compared to the field of view may vary depending on, for example, an average latency of requested video streams. As such, a client device may dynamically adjust an active region size with regard to the field of view and/or an active region resolution in an effort to balance display quality and low latency when moving between active region streams.

In another embodiment, active streams may be wider (with respect to the field of view) in the direction or directions in which the viewing orientation is more likely to change. For example, in scenarios where a viewer is more likely to pan the viewing orientation horizontally compared to panning vertically (e.g., watching a surfer from the beach), the active region may be wider horizontally than vertically.

As described herein, the active streams may have multiple resolutions. For example, active regions closest to the viewing orientation may be designated as having the highest relative resolution. In such a scenario, moving outward from the viewing orientation axis, other active regions may have medium orientation. Yet further, active regions around an outermost extent of the overall active region may have the lowest relative resolution. Accordingly, when users change their viewing orientation, they may notice a gradual reduction in resolution instead of an abrupt decrease in resolution.

C. Video Transcoding and Streaming

Figure 3:
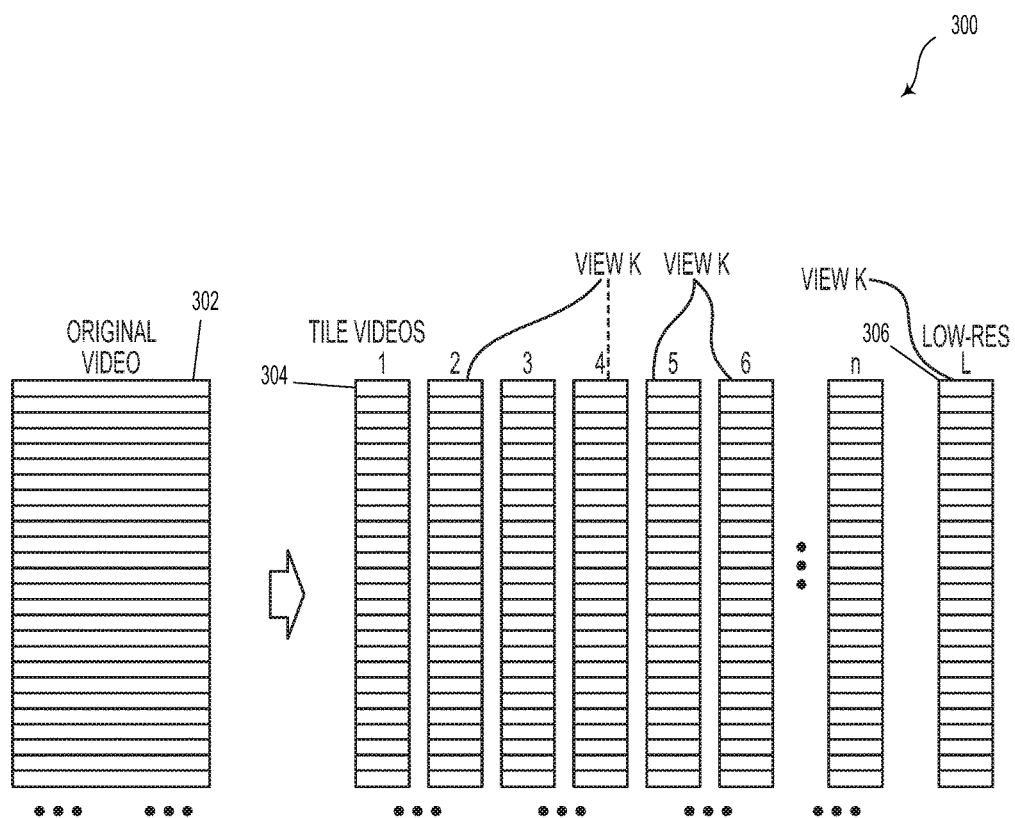
FIG. 3 illustrates a tiled video stream, according to an example embodiment.

FIG. 3 illustrates a tiled video stream 300, according to an example embodiment. For example, a streaming client may maintain a flexible number of connections with multiple streaming sources, as shown in FIG. 3. In this design, the original video stream 302 is divided into many regional video streams 304, which may include different bitrates and a downsampled spherical stream 306, L. As such, the client device may determine which video streams to connect to, and when. As shown in FIG. 3, the original video streaming is first divided into n regional streams 304, or tiles. Thereafter, at any specific time, the client may decide to connect to one or more regional streams 304. Based on the received information from the one or more regional streams 304, the client device may render the streamed tiles and display at least a portion of the regional streams 304 for users. Furthermore, the downsampled spherical stream 306 may be rendered for users and provided in parallel to the regional streams 304 and/or when necessary due to, for example, high latency network conditions or insufficient bandwidth.

Figure 4:
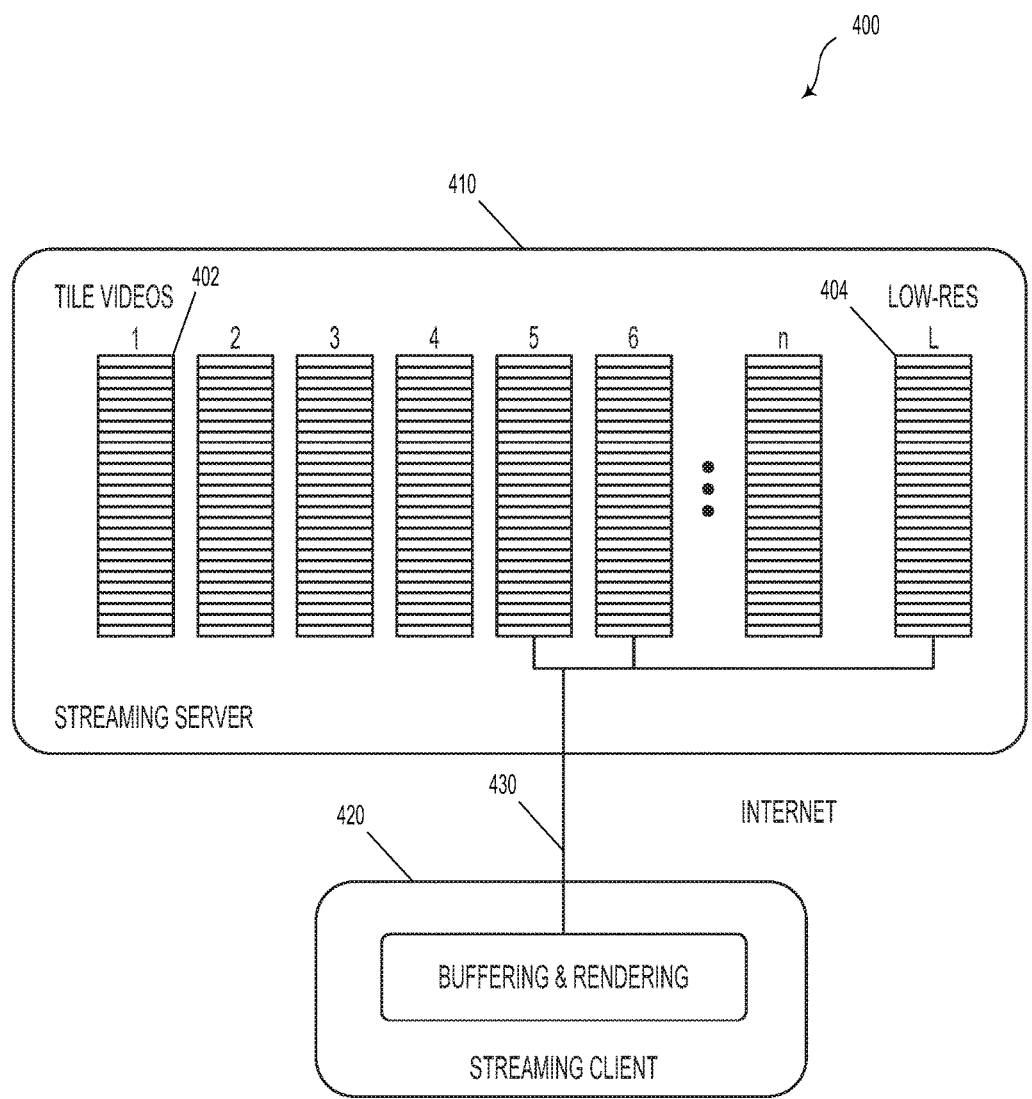
FIG. 4 is a schematic communication diagram, according to an example embodiment.

FIG. 4 is a schematic communication diagram 400, according to an example embodiment. As shown in FIG. 4, a client 420 may maintain a fixed number of UDP, TCP/IP or HTTP connections 430 with one or more streaming servers 410. When a viewing orientation is changed or updated, the new regional video streams 402 and/or a downsampled spherical stream 404 may be routed so as to re-use the existing network connections 430, without initializing new connections. This may improve efficiency be reducing or eliminating the time to initialize network connections and network latency.

Figure 5:
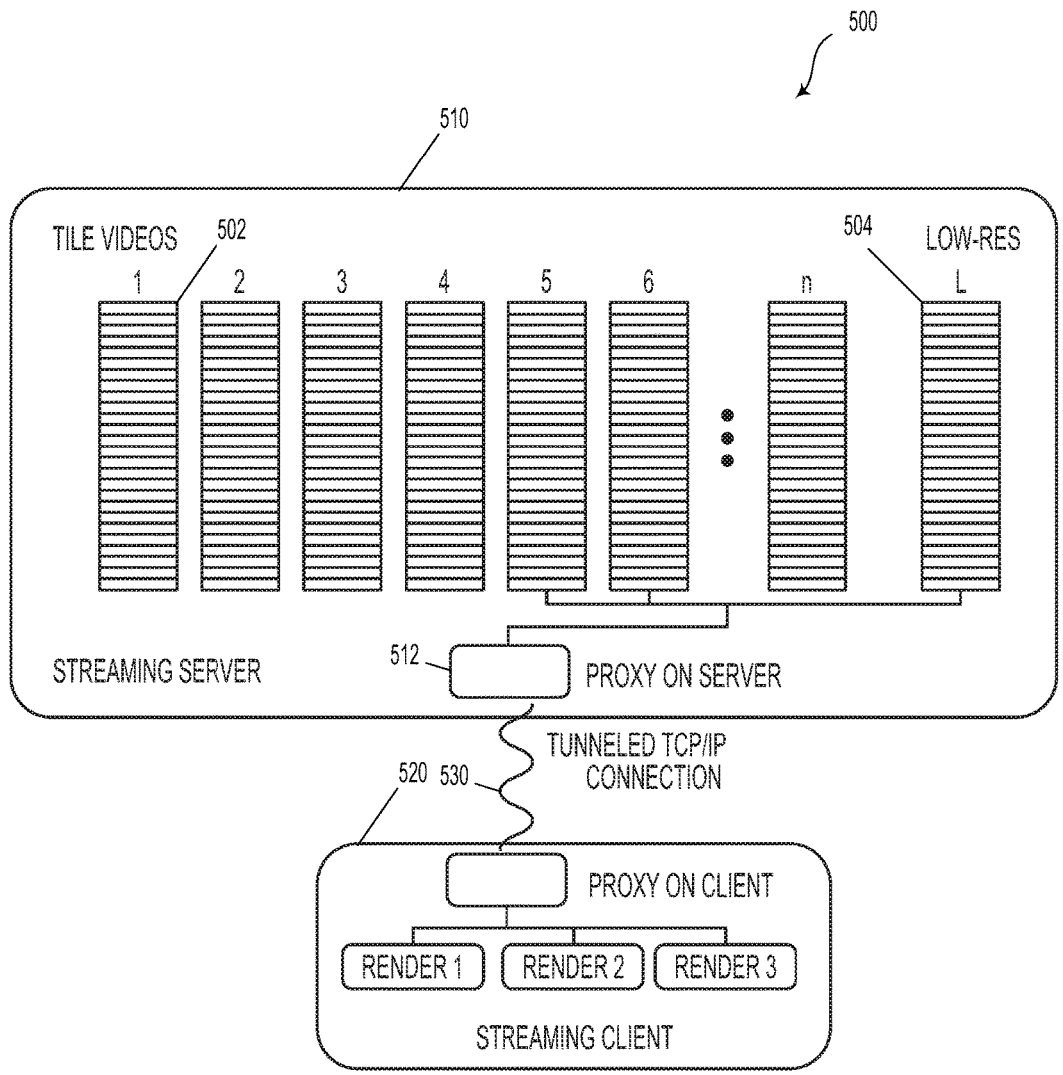
FIG. 5 is a schematic communication diagram illustrating a tunnel connection, according to an example embodiment.

FIG. 5 is a schematic communication diagram 500 illustrating a tunnel connection, according to an example embodiment. In such an embodiment, a client device 520 may maintain a single tunnel TCP/IP connection 530 with the streaming server 510. As such, connections with regional video streams 502 and the low-res video stream L 504 may be included in the tunnel 530. For example, a proxy 512 on the server 510 may be configured to consolidate packets from the regional streams 502 and the low-resolution stream 504 into a single tunneled connection 530.

Figure 6:
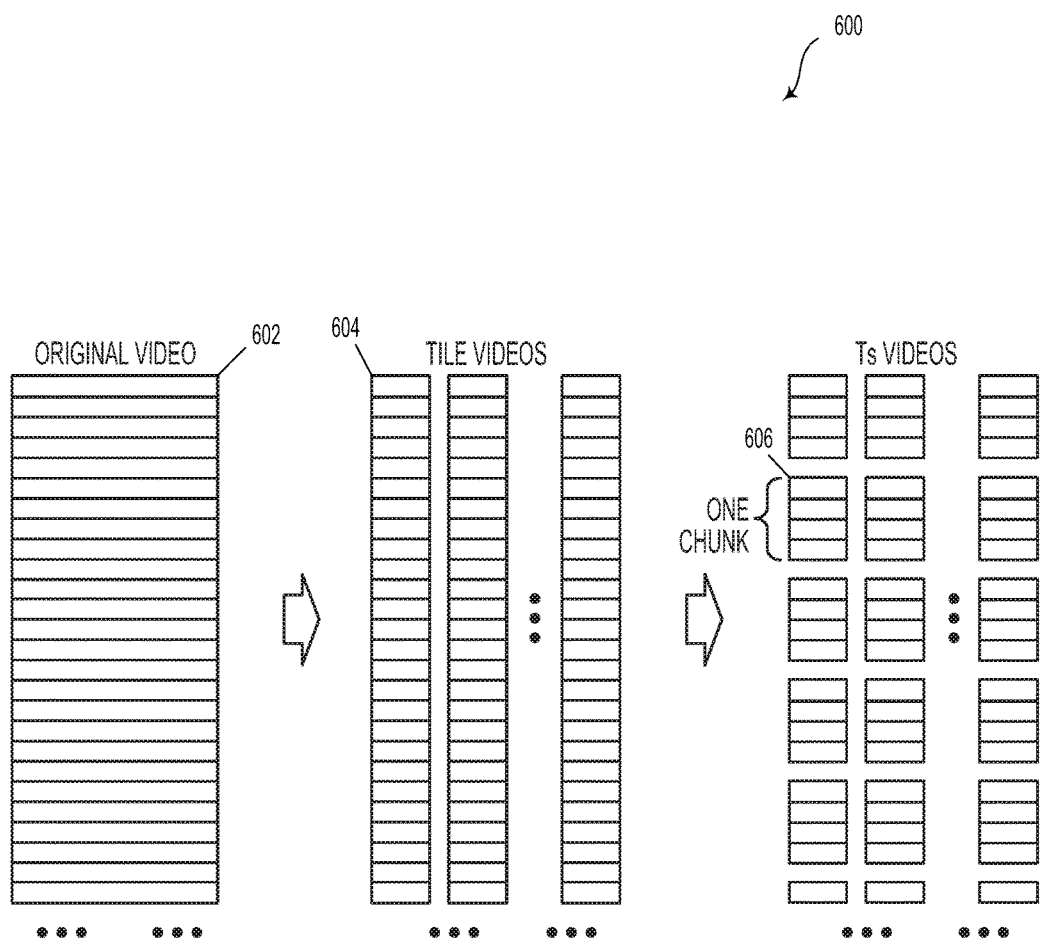
FIG. 6 is a schematic video subdivision diagram illustrating tiles and transportation segments, according to an example embodiment.

FIG. 6 is a schematic video subdivision diagram 600 illustrating tiles and transportation segments, according to an example embodiment. In such an embodiment, a client may be configured to maintain only one streaming connection with a video streaming server. As such, under the present systems and methods, the streaming server may provide a multiplexed stream that includes information about a plurality of video streams and/or audio streams. The transcoding steps may proceed as follows:

The original stream 602 is first divided into m regional streams 604 or tile videos, as shown in FIG. 6. Each regional stream 604 may be further subdivided into transportation (or transport) segments 606 (TS) of fixed length (e.g. between 500 milliseconds to 2 seconds). Each TS 606 may begin with an intra-coded image (e.g., an I-Frame) and may end with a predicted frame (e.g., a P-Frame) or an I-Frame. As such, each transport segment 606 may be decoded without information from other transport segments.

In an example embodiment, each TS 606 may include a fixed number of frames. For example, a transport segment may include 168 individual video frames. Additionally or alternatively, some or all transport segments may include audio frames.

Figure 7:
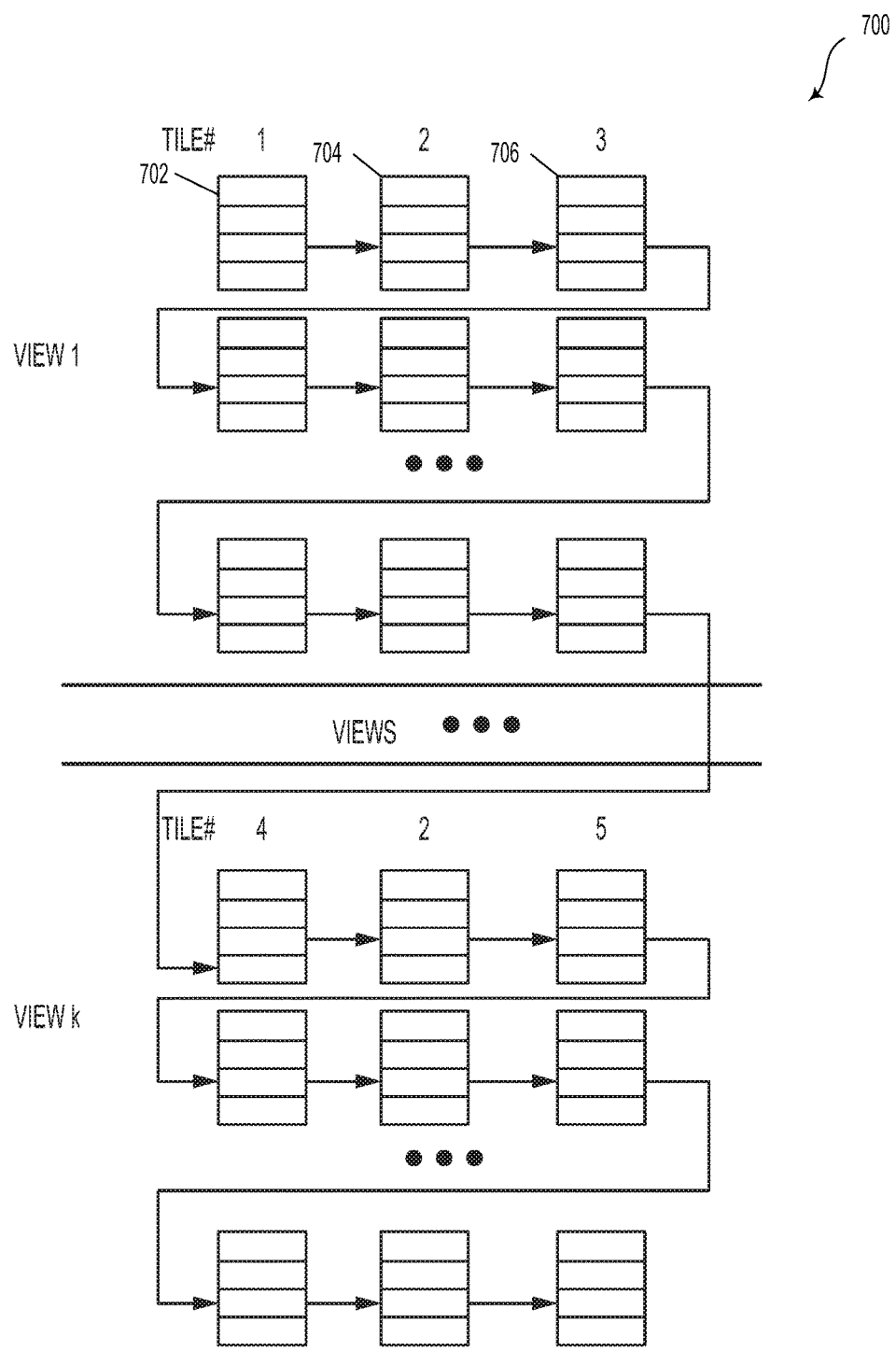
FIG. 7 is a schematic diagram illustrating multiple subdivided video streams, according to an example embodiment.

FIG. 7 is a schematic diagram 700 illustrating multiple subdivided video streams, according to an example embodiment. For each viewing orientation or view angle, a media index file may be created. The media index file may include information about how information is arranged in the multiplexed video stream, as shown in FIG. 7. As a non-limiting example, three active regions 1, 2, and 3, may provide transport segments 702, 704, and 706, each of which is 1 second long. That is, during each second, the three TS 702, 704, and 706 from the three active regions, respectively, are streamed to the client. In the example embodiment, each view angle has a different set of active regions. For example, assume the sphere has N discrete view angles, then the master index file may include a concatenation of N media index files as illustrated in FIG. 7. For example, in an HTTP Live Streaming protocol, the master index file is called a "master playlist," the media index file is called a "media playlist."

Note that in FIG. 7, all TS segments sum up to be the original streaming without duplication or redundancy. In such a fashion, different active regions are provided by combining multiple tile views, and tile combinations are defined via index files, so no significant extra storage is needed for transcoding.

On the client side, for each video frame it receives, the client can decode Tile# of the frame, and the play time in the video via the timestamp (T) from the following equation.

$$T = (v \times T_v) + (x \times T_x) + (c \times T_c) + (f \times T_f),$$

where v: the view index; x: the chunk index in one regional streaming; c: the tile index; f: the frame index in a TS segment; $T_v$=Video length (padding to be multiplier of $T_x$); $T_x$=x-chunk duration (3 seconds in FIG. 7); $T_c$=Chunk duration (e.g., 1 second); and $T_f$=Frame duration.

Additionally, $T_v$, $T_x$, $T_c$, $T_f$ are known at the transcoding stage, and have relations as follows:

$$Tv = Tx * \text{Total\_Chunk\#}$$

$$Tx = Tc * \text{Active\_View\#}$$

$$Tc = Tf * \text{Total\_Frame\#\_in\_TS}$$

$Tf$=Encoded in each frame, generally constant from frame to frame.

Therefore, the client can uniquely derive v, x, c, and f from a frame timestamp (T).

In an example embodiment, when a viewer changes their view angle, the view index v changes. From the expression for T above, a new timestamp T can be found for the updated view angle (view index). In such a scenario, the client may request that the server stream a new TS based on the updated timestamp. Using this system and method, the client is able to render every received frame to the right screen position.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

The invention claimed is:

1. A system comprising:
   a display;
   a sensor;
   a communication interface; and
   a controller comprising a memory and at least one processor; and
   program instructions stored in the memory and executable by the at least one processor to carry out operations, the operations comprising:
      receiving, from the sensor, information indicative of a viewing orientation within a viewing volume, wherein the viewing orientation corresponds to a field of view;
      determining, based on the viewing orientation, a plurality of active regions from a plurality of viewable regions in the viewing volume;
      connecting, via the communication interface, to a plurality of video streams that correspond to the plurality of active regions;
      receiving, via the plurality of video streams, first video information corresponding to the plurality of active regions, wherein the first video information is divided among the plurality of video streams based on an average entropy map, wherein the average entropy map is indicative of average pixel information;
      receiving second video information corresponding to a 360° field of view, wherein the first video information has a higher resolution than the second video information;
      rendering a 360° video based on the first video information in the plurality of active regions and the second video information in regions of the viewing volume outside the plurality of active regions; and
      displaying, via the display, at least a portion of the 360° video corresponding to the field of view.

2. The system of claim 1, wherein the operations further comprise:
   receiving, from the sensor, information indicative of an updated viewing orientation, wherein the updated viewing orientation corresponds to an updated field of view;
   determining, based on the updated viewing orientation, an updated plurality of active regions from a plurality of viewable regions in the viewing volume;
   disconnecting at least one video stream that does not correspond to the updated plurality of active regions;
   connecting, via the communication interface, to an updated plurality of video streams that correspond to the updated plurality of active regions;
   receiving, via the updated plurality of video streams, updated video information corresponding to the updated plurality of active regions;
   rendering an updated 360° video based on the updated video information in the updated plurality of active regions and the second video information in regions of the viewing volume outside the updated plurality of active regions; and
   displaying, via the display, at least a portion of the updated 360° video corresponding to the updated field of view.

3. The system of claim 1, wherein the operations further comprise:
   receiving, from the sensor, information indicative of a movement of the system; and
   based on the movement of the system, determining a predicted rate of change or a predicted movement, wherein determining the plurality of active regions is further based on the predicted rate of change or predicted movement.

4. The system of claim 1, wherein the plurality of active regions comprises a larger portion of the viewing volume than the field of view.

5. The system of claim 1, wherein displaying the first video information and the second video information is synchronized in time.

6. The system of claim 1, wherein the operations further comprise:
   connecting, via the communication interface, to at least one audio stream;
   receiving, via the at least one audio stream, a sound track; and
   playing back the sound track in synchronicity with the first video information and the second video information.

7. The system of claim 1, wherein at least the display and sensor are incorporated into a virtual reality headset.

8. The system of claim 1, wherein connecting to the plurality of video streams comprises connecting via at least one UDP, TCP/IP, or HTTP connection with at least one streaming server.

9. The system of claim 1, wherein connecting to the plurality of video streams comprises connecting via one tunnel UDP, TCP/IP, or HTTP connection with a streaming server.

10. The system of claim 1, wherein connecting to the plurality of video streams comprises connecting via a multiplexed network connection with a streaming server, wherein the multiplexed network connection comprises a network connection configured to communicate fixed length transportation segments from the first video information.

11. A system comprising:
a communication interface; and
a controller comprising a memory and at least one processor; and
program instructions stored in the memory and executable by the at least one processor to carry out operations, the operations comprising:
dividing a 360° video stream into a plurality of regional streams, wherein dividing the 360° video stream into the plurality of regional streams comprises:
calculating an entropy map for each frame of at least a portion of the 360° video stream;
averaging, on a per-pixel basis, the entropy maps corresponding to the portion of the 360° video stream to provide an average entropy map, wherein the average entropy map is indicative of average pixel information; and
dividing the average entropy map into a plurality of regions, wherein each region has a similar amount of pixel information, wherein the plurality of regional streams correspond to the plurality of regions;
downsampling the 360° video stream to provide a lower resolution 360° video stream;
receiving, via the communication interface, a request, wherein the request comprises at least one active region;
providing, via the communication interface, at least one regional stream corresponding to the at least one active region; and
providing, via the communication interface, the lower resolution 360° video stream.

12. The system of claim 11, wherein the operations further comprise providing, via the communication interface, at least one audio stream, wherein the communication interface comprises at least one of: at least one network connection with at least one client device or at least one tunnel TCP connection with at least one client device.

13. The system of claim 11, wherein dividing the average entropy map into a plurality of regions is performed using at least one of: linear programming, dynamic programming, or at least one numerical optimization algorithm.

14. The system of claim 11, wherein the communication interface comprises a multiplexed network connection with at least one client device, wherein providing the at least one regional stream comprises providing fixed length transportation segments from the lower resolution 360° video stream and the at least one regional stream corresponding to the at least one active region.

15. A method comprising:
receiving, from a sensor, information indicative of a viewing orientation within a viewing volume, wherein the viewing orientation corresponds to a field of view;
determining, based on the viewing orientation, a plurality of active regions from a plurality of viewable regions in the viewing volume;
connecting, via a communication interface, to a plurality of video streams that correspond to the plurality of active regions;
receiving, via the plurality of video streams, first video information corresponding to the plurality of active regions, wherein the first video information is divided among the plurality of video streams based on an average entropy map, wherein the average entropy map is indicative of average pixel information;
receiving second video information corresponding to a 360° field of view, wherein the first video information has a higher resolution than the second video information;
rendering a 360° video based on the first video information in the plurality of active regions and the second video information in regions of the viewing volume outside the plurality of active regions; and
displaying, via a display, at least a portion of the 360° video corresponding to the field of view.

16. The method of claim 15, further comprising:
receiving, from the sensor, information indicative of an updated viewing orientation, wherein the updated viewing orientation corresponds to an updated field of view;
determining, based on the updated viewing orientation, an updated plurality of active regions from a plurality of viewable regions in the viewing volume;
disconnecting at least one video stream that does not correspond to the updated plurality of active regions;
connecting, via the communication interface, to an updated plurality of video streams that correspond to the updated plurality of active regions;
receiving, via the updated plurality of video streams, updated video information corresponding to the updated plurality of active regions;
rendering an updated 360° video based on the updated video information in the updated plurality of active regions and the second video information in regions of the viewing volume outside the updated plurality of active regions; and
displaying, via the display, at least a portion of the updated 360° video corresponding to the updated field of view.

17. The method of claim 15, further comprising:
connecting, via the communication interface, to at least one audio stream;
receiving, via the at least one audio stream, a sound track; and
playing back the sound track in synchronicity with the first video information and the second video information.

18. The method of claim 15, wherein connecting to the plurality of video streams comprises connecting via one tunnel TCP or HTTP connection with a streaming server.

19. The method of claim 15, wherein connecting to the plurality of video streams comprises connecting via a multiplexed network connection with a streaming server, wherein the multiplexed network connection is configured to communicate fixed length transportation segments from the first video information.

* * * * *